E. BLACKMAN.
Cart Scales.
No. 36,631.
Patented Oct. 7, 1862.
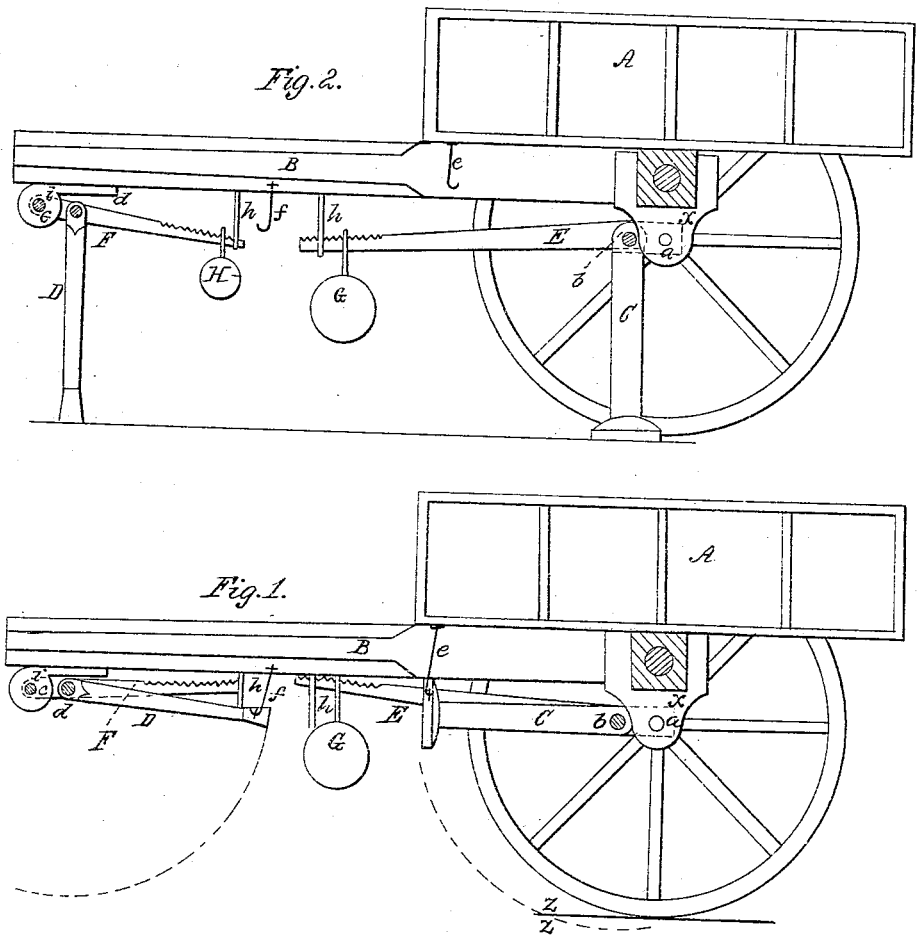

UNITED STATES PATENT OFFICE.

EDWIN BLACKMAN, OF DANBURY, CONNECTICUT, ASSIGNOR TO HIMSELF AND JAMES S. TAYLOR, OF SAME PLACE.

IMPROVEMENT IN SELF-WEIGHING CARTS.

Specification forming part of Letters Patent No. 36,631, dated October 7, 1862.

*To all whom it may concern:*

Be it known that I, EDWIN BLACKMAN, of Danbury, county of Fairfield, in the State of Connecticut, have invented certain new and useful Improvements in Cart-Scales or Self-Weighing Carts; and I do hereby declare that the following is a full and exact description thereof, reference being had to the accompanying drawings, and to the letters of reference marked thereon.

In the drawings, Figure 1 is a view of the invention as it appears when the scales are not used. Fig. 2 represents it in the act of weighing a load.

To enable others skilled in the art to make and use my invention, I will describe its construction and operation.

In the drawings, A represents an ordinary two-horse or two-oxen cart.

B is the tongue of the cart.

X are metallic journal-boxes attached to the axle of the cart.

C is the platform, connected by a steel knife-edge pivot, $b$, to the main steelyard-lever E, which is connected to the journal-boxes X by a similar pivot, $a$.

D is the adjustable "prop" at the end of the tongue, and is pivoted at $d$ to the smaller steelyard, F, which is pivoted at $c$ to the metallic journal-box $i$.

G and H are the balance-weights.

$e$ and $f$ are hooks for holding the platform C and prop D up out of the way, as shown in Fig. 1, when the cart is in motion.

$h\,h$ are guide-loops near the ends of the steelyard-levers E and F. The levers E and F are pivoted and marked proportionally in pounds, &c., as in the ordinary steelyards. It will be seen that the platform C is the fulcrum for the steelyard E, and that prop D is the fulcrum of the steelyard F, while the cart and its contents is the weight operating upon them both, and that the "weights" G H are the "power" that makes equipoise.

In operating my invention, when it is desired to ascertain the weight of the cart and its contents, we unhook hooks $e$ and $f$, thus releasing platform C and prop D. Here let it be observed that the distance between the pivots and lower ends of the platform and prop is an inch or so greater than the radius of the cart-wheels, so that when the cart is supported upon the platform and prop the wheels cannot touch the ground. When platform C touches the ground, (as at $z$, Fig. 1,) the cart is pulled forward a few inches, the resistance being at $z$, until the platform is made to assume a vertical position, as shown in Fig. 1. Prop D is then vertically adjusted, and the whole weight of the cart and its contents is then thrown upon the fulcra C D. The balance-weights G and H are then adjusted upon the two steelyards until an equipoise or equilibrium is indicated. The two sums then indicated by the two scales are then added together, and the sum resulting will be the weight of carts and contents.

Instead of using the steelyard F and prop D at the end of the tongue, I may find it convenient to substitute a strong spring-scales suspended in a suitable manner from the cattle used in drawing the cart.

My device can also be readily adapted to one-horse vehicles.

At an expense of but a few dollars my invention can be applied to coal (and other) carts, so that purchasers can weigh the coal at their own doors, and thus avoid a constant source of complaint. In the coal-yard, too, the coal can be shoveled directly into the cart instead of first upon the platform-scales, and then into the cart.

What I claim as my invention, and desire to secure by Letters Patent, is—

The steelyard E and platform C, in combination with steelyard F and prop D, (or spring-scales suspended from the cattle,) when constructed and applied to a cart substantially in the manner and for the purposes hereinbefore set forth.

In testimony that I claim the above I hereunto set my hand in the presence of two witnesses.

EDWIN BLACKMAN.

Witnesses:
ROGER AVERILL,
WILLIAM H. HANFORD.